United States Patent
Wang et al.

(10) Patent No.: US 7,976,726 B2
(45) Date of Patent: Jul. 12, 2011

(54) PREVENTION OF QUANTUM DOT QUENCHING ON METAL SURFACES

(75) Inventors: Cheng-I Wang, Foster City, CA (US); Haixia Dai, Mountain View, CA (US); Manfred Heidecker, Mountain View, CA (US)

(73) Assignee: Siluria Technologies, Inc., San Francisco, CA (US)

( * ) Notice: Subject to any disclaimer, the term of this patent is extended or adjusted under 35 U.S.C. 154(b) by 1112 days.

(21) Appl. No.: 11/740,213

(22) Filed: Apr. 25, 2007

(65) Prior Publication Data

US 2008/0050513 A1 Feb. 28, 2008

Related U.S. Application Data

(60) Provisional application No. 60/796,296, filed on Apr. 27, 2006.

(51) Int. Cl.
*C09K 11/08* (2006.01)
*C09K 11/02* (2006.01)

(52) U.S. Cl. ............ 252/301.6 S; 252/301.36; 436/525

(58) Field of Classification Search .................. 436/525; 252/301.36, 301.4 R, 301.6 R, 301.6 S
See application file for complete search history.

(56) References Cited

U.S. PATENT DOCUMENTS
6,576,155 B1 * 6/2003 Barbera-Guillem ..... 252/301.36
2005/0130258 A1 6/2005 Trent et al.

FOREIGN PATENT DOCUMENTS
WO WO 2006/053435 * 5/2006

OTHER PUBLICATIONS

Zheng et al, "Individual Water-Soluble Dendrimer-Encapsulated Silver Nanodot Fluorescence", J. Am. Chem. Soc. 124, 13982-13983, Oct. 31, 2002.*
Zheng et al, "Highly Fluorencent, Water-Soluble, Size-Tunable Gold Quantum Dots", Phys. Rev. Let. vol. 93, # 7, pp. 077402-1 to 077402-4, Aug. 13, 2004.*
Bertini et al., "High Resolution Solution Structure of the Protein Part of Cu7 Metallothionein", Eur. J. Biochem. 267:1008-1018, 2000.
Battaglia and Peng, "Formation of High Quality InP and InAs Nanocrystals in a Noncoordinating Solvent", Nano Lett. 2(9):1027-1030, Aug. 15, 2002.
Zheng and Dickson, "Individual Water-Soluble Dendrimer-Encapsulated Silver Nanodot Fluorescence", J. Am. Chem. Soc. 124(47):13982-13983, Oct. 31, 2002.
Mao et al., "Viral Assembly of Oriented Quantum Dot Nanowires", PNAS 100(12):6946-6951, Jun. 10, 2003.
Petty et al., "DNA-Templated Ag Nanocluster Formation", J. Am. Chem. Soc. 126(16):5207-5212, Apr. 28, 2004.
Zheng et al., "Highly Fluorescent, Water-Soluble, Size-Tunable Gold Quantum Dots", Physical Review Letters 93 (7):077402-1 to 077402-4, Aug. 13, 2004.
Li et al., "High Quality ZnSe and ZnS Nanocrystals Formed by Activating Zinc Carboxylate Precursors", Nano Lett. 4 (11):2261-2264, Oct. 14, 2004.

* cited by examiner

*Primary Examiner* — C. Melissa Koslow
(74) *Attorney, Agent, or Firm* — Seed IP Law Group PLLC

(57) ABSTRACT

A formulation comprises quantum dots and a quenching-preventive agent in a carrier material. The quenching-preventive agent is a metal chelating agents, a corrosion inhibitor, or a combination thereof. The formulation can be applied to a metal substrate, without experiencing metal ion induced fluorescence quenching.

13 Claims, 11 Drawing Sheets
(10 of 11 Drawing Sheet(s) Filed in Color)

1. Dilute Qdot655 to 20 nM in water with or without 50 mM EDTA
2. Spot 10 μl on brass or glass
3. Air dry

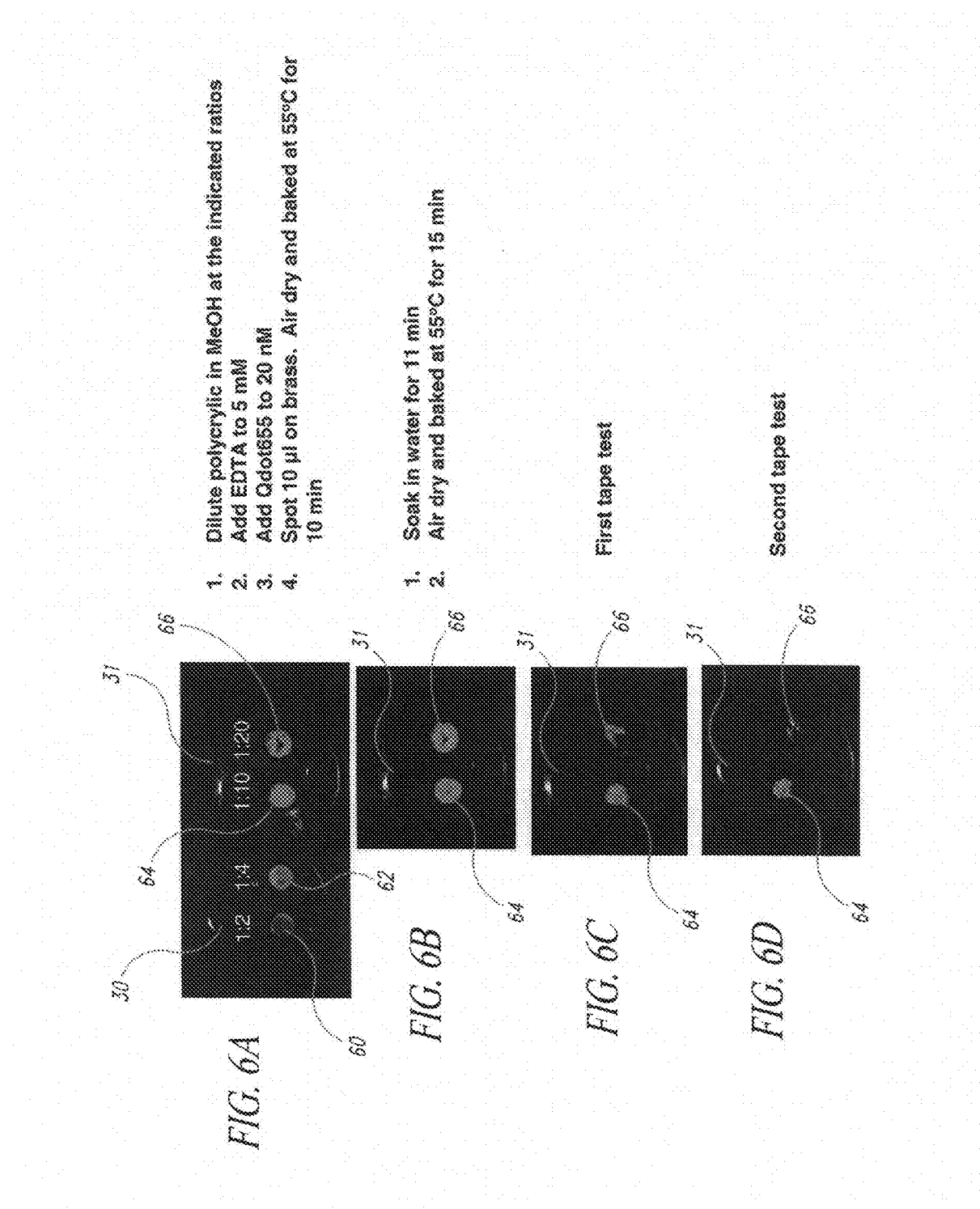

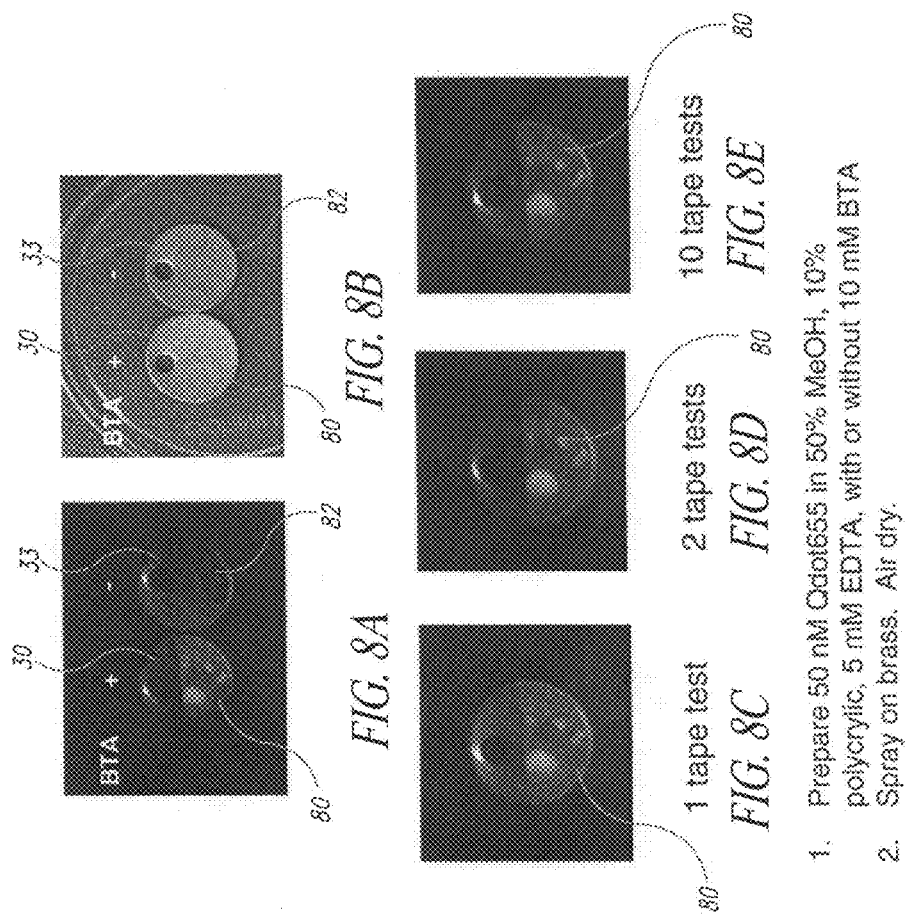

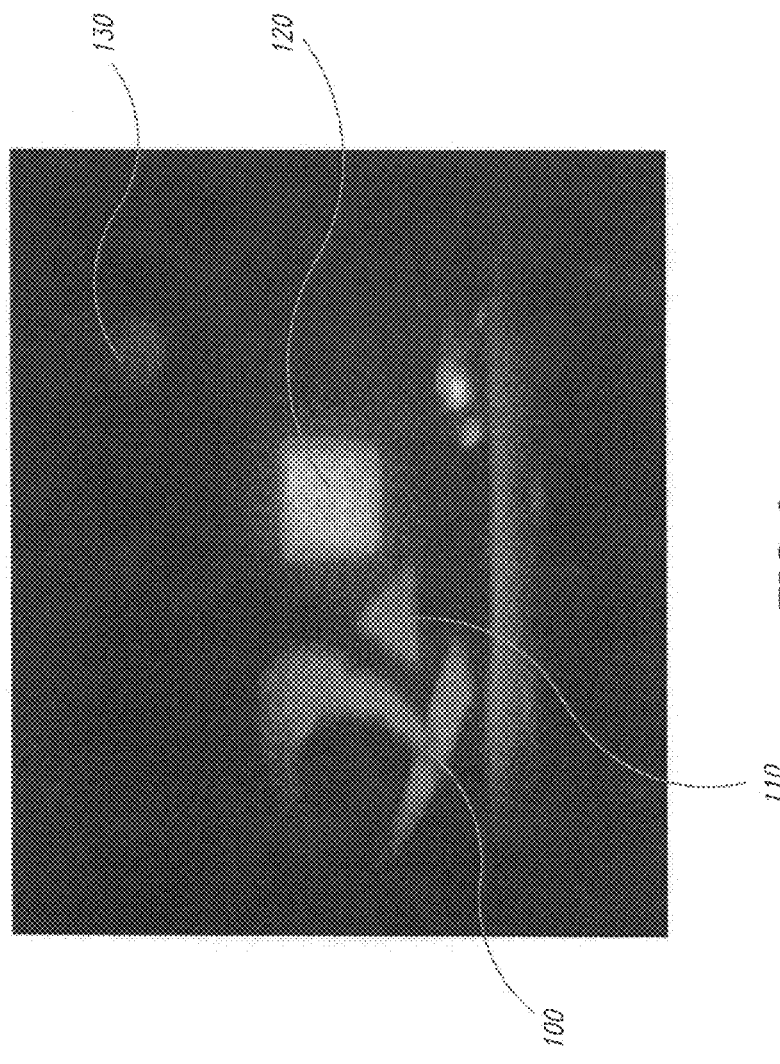

1. Prepare 50 nM Qdot800 in 50% methanol, 10% polyacrylic, 5 mM EDTA, 10 mM BTA
2. Spray on brass. Air dry

US 7,976,726 B2

PREVENTION OF QUANTUM DOT QUENCHING ON METAL SURFACES

FIELD OF THE INVENTION

This invention relates to improving the fluorescence intensity of quantum dots deposited on metal surfaces, in particular, to formulations of quantum dots and methods of preventing quenching thereof.

BACKGROUND OF THE INVENTION

Quantum dots are nano-sized inorganic fluorophores based on semiconductor or metallic materials. They are typically structured as three-dimensional groupings or clusters of atoms (ranging from a few to as many as 10,000) whose electron motion is confined by potential barriers in all three dimensions. This so-called "quantum confinement" phenomenon has significant ramifications for the absorptive and emissive behaviors of the quantum dots. For example, quantum dots exhibit size-dependent fluorescence with narrow emission bandwidths (FWHM~30 to 45 nm) that span the visible and near infrared (IR) spectra. The quantum dots are further characterized with broad absorption bands, which allow for the simultaneous excitation of several particle sizes (fluorescent colors) at a common wavelength.

Quantum dots are known to exhibit useful spectral characteristics. They have been used as taggants for tracking individual items. Quantum dots, if properly applied to an object, have the advantage that they are invisible under normal lighting conditions, i.e., they do not fluoresce when exposed to the visible range of the light spectrum. When the object marked with the quantum dots is subjected to ultraviolet light the quantum dots fluoresce, providing a bright, easily identifiable image pattern in the visible range (about 400 nm-700 nm). Certain quantum dots fluoresce into the near IR region (about 700 nm-1400 nm) and can be visualized by, for example, night vision goggles.

The fluorescent image patterns can be authenticated or decoded through direct visualization or a reading device under the appropriate light source. This permits specific identification of an object to provide security benefits such as brand protection, and counterfeit prevention. For example, a pattern created on an object by quantum dots can be specifically linked to that product for later tracking and identification. Such a pattern can also be used to prevent counterfeiting of goods and to distinguish an authentic product from a counterfeit product.

Quantum dots have the advantage of being both physically and spectrally undetectable under normal lighting conditions. The microscopic dimensions of the quantum dots allow for their easy incorporation into carrier materials such as solvents, paint, ink, binders or adhesives. These quantum dot formulations can be sprayed, deposited, printed, pressed, or otherwise applied to a substrate of interest.

Currently, when quantum dots are applied to metals such as copper, brass, stainless steel, bronze, aluminum, nickel, etc, the fluorescence intensity of the quantum dots can be dramatically reduced or quenched. In addition, the quantum dots may easily rub off of the substrate materials, particularly smooth materials such as stainless steel and brass. This limits the current use of quantum dots on such metallic surfaces.

Accordingly, there remains a need in the art to provide quantum dot formulations having improved spectral and environmental stability, particularly with respect to metal substrates.

BRIEF SUMMARY OF THE INVENTION

In certain embodiments, it is describe herein a formulation comprising a plurality of quantum dots, at least one quenching-preventive agent and a carrier material. The particular composition of the carrier material, quantum dots and the quenching-preventive agent is selected and optimized in order to permit application of the quantum dots to a large variety of substrates, on which the quantum dots fluoresce when irradiated.

The presence of the quenching-preventive agent helps to preserve the fluorescence intensity of the quantum dots that may otherwise be quenched by the metals.

In various embodiments, the quenching-preventative agent is a metal ion scavenger (e.g., a metal chelating agent), a corrosion inhibitor, or a combination thereof.

In further embodiments, the carrier material can be a mixture of at least one solvent and a matrix material. The solvent may be, for example, water, methanol, or a mixture thereof. The matrix material can be for example, a polymer.

In a further embodiment, it is described herein a method comprising: providing a formulation having a plurality of quantum dots, one or more quenching-preventive agents and a carrier material; and applying the formulation to a substrate.

In a further embodiment, it is described herein a method comprising: mixing a quenching-preventive agent in a carrier material; and suspending a plurality of quantum dots in the carrier material.

BRIEF DESCRIPTION OF THE SEVERAL VIEWS OF THE DRAWINGS

The patent or application file contains at least one drawing executed in color. Copies of this patent or patent application publication with color drawings will be provided by the Office upon request and payment of the necessary fee.

FIGS. 6A-6D illustrate the quantum dots in a formulation of a mixture of polyacrylate and polyurethane in methanol and various performance tests being conducted.

FIGS. 8A-8E illustrate the effect of a corrosion inhibitor added to the formulation of methanol, water, and a mixture of polyacrylate and polyurethane.

FIG. 9 shows Qdot®800 (Invitrogen) deposited on various metal substrates.

DETAILED DESCRIPTION OF THE INVENTION

Figure 1:
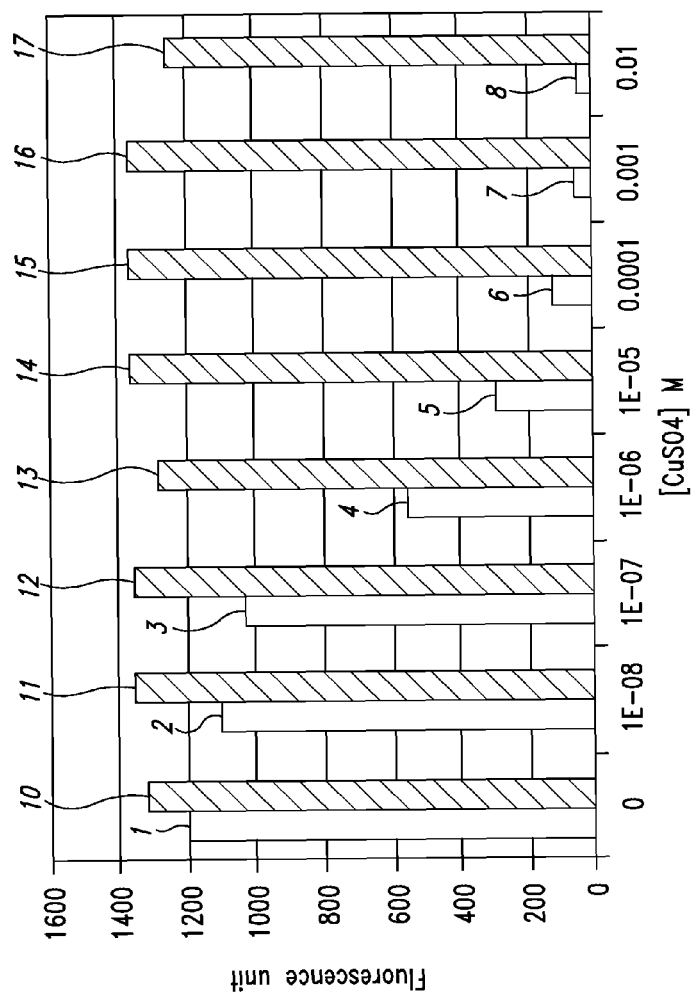
FIG. 1 is a graph showing the comparison between the fluorescence of a formulation having the chelating agent present and a formulation without the chelating agent.

In certain embodiments, it is described herein a formulation comprising a plurality of quantum dots, a quenching-preventive agent and a carrier material. The formulation, also referred to as "quantum dot formulation", is a fluid suited for applying the quantum dots on a substrate. More specifically, the formulation can be optimized to preserve the fluorescence intensity of the quantum dots on metal substrates.

Quantum dots having emissions in the visible and near IR regions (about 400-1400 nm) are susceptible to quenching when deposited on metal substrates. Without wishing to be bound by any theory, it is believed that a trace amount of metal ions may cause the quenching.

Metal substrates, when in contact with a fluid such as one in which the quantum dots are suspended, can corrode and release ions. Metal ions, in particular, ions of transition metals (e.g., copper, iron, nickel, chromium or their alloys) absorb strongly in the visible and near IR range. For example, copper ions ($Cu^{2+}$) absorb at 800 nm and trail to about 600 nm. In addition, metal ions may become bound to the quantum dots and cause a loss in fluorescence. The outcome is that some or all of the fluorescence can be quenched by the metal ions proximate to the quantum dots.

Combining a quenching-preventive agent with the quantum dots can effectively prevent the fluorescence quenching caused by the metal ions. In certain embodiments, the quenching-preventive agent is a metal ion scavenger, which forms stable complexes with any metal ions released from the metal substrate. In other embodiments, the quenching-preventive agent is a corrosion inhibitor, which stabilizes a surface of the metal substrate and inhibits the release of any metal ions.

Moreover, the formulation further comprises a carrier material. The carrier material provides a fluid medium in which the quantum dots and the one or more quenching-preventive agents are suspended. The formulation is suited for direct application to any substrate, in particular, to metals or metal alloys of copper, brass, stainless steel, iron, and the like.

In certain embodiments, the carrier material comprises one or more solvents. The solvents are selected for their non-corrosiveness as well as their ability to disperse all the constituents of the formulation. Typically, the solvents evaporate after the application of the quantum dot formulation to the substrate. It is therefore further desirable that the solvents have low environmental impact.

In other embodiments, the carrier material further comprises a binder material. Unlike the solvent(s), the binder material does not evaporate after the application of the quantum dot formulation. The binder material secures the quantum dots to the substrate such that the quantum dots can withstand abrasion and remain adhered to the substrate. It therefore provides improved environmental stability to the quantum dot formulation. An exemplary binder material is a polymer.

In further embodiments, it is described herein a method of preparing a formulation comprising mixing a plurality of quantum dots and a quenching-preventive agent in a carrier material.

In yet further embodiments, it is described herein a method of using a formulation including a plurality of quantum dots, a quenching-preventive agent and a carrier material, the method comprising: applying the formulation to a substrate, irradiating the substrate and detecting any fluorescence emitted by the quantum dots. Advantageously, the method provides an optimizable technique to effectively prevent quenching of the quantum dots on a metal substrate.

A. Quantum Dot Formulation

As noted above, the quantum dot formulation comprises a plurality of quantum dots, one or more quenching-preventive agents and a carrier material.

1. Quantum Dots

Quantum dots are colloidal crystals or nanocrystals of a semiconductor or metallic materials. Quantum dots are fluorophores that absorb energy at one wavelength of radiation and subsequently reemit energy at another, different wavelength.

The energy absorbed is also referred to as "excitation energy". An excitation energy can be any electromagnetic energy sufficient to excite the fluorophore from a steady state to a higher electronic state, also referred to as an "excited state". The fluorophore returns from the excited state to its steady state by photon emission, i.e., fluorescence. An excitation energy is typically higher in energy and shorter in wavelength than the fluorescent light emitted. Examples of excitation energies include light, X-rays and electron beams.

In certain embodiments, the quantum dots emit light in a range of wavelengths between 400 nm and 1400 nm, when exposed to an excitation energy.

In certain embodiments, visible light is not sufficient in energy to excite the fluorescent particles from a non-emitting steady state to an excited state. The quantum dots therefore do not fluoresce when exposed to normal lighting conditions. "Normal lighting conditions" refers to a visible range of the light spectrum perceptible by the human eye. The visible range is from about 400 nm to 700 nm. These quantum dots typically require an excitation energy higher than the energy of visible light. For example, they may absorb ultraviolet light and fluoresce in the visible and near IR regions (between about 400 nm and about 1400 nm). Advantageously, these quantum dots are optically undetectable under the normal lighting condition, but become fluorescent when exposed to ultraviolet light.

In other embodiments, the quantum dots can be excited by white light in the visible range and emit light in a range of wavelength between 400 nm and 1400 nm.

As understood by one skilled in the art, the emission characteristics of the quantum dots are related to their sizes. In certain embodiments, the quantum dots are no more than 1000 nm in diameter. In certain embodiments, they are no more than 500 nm in diameter. In other embodiments, they are no more than 50 nm in diameter. In other embodiments, they are no more than 5 nm in diameter.

Although it is not always necessary, the quantum dots of certain embodiments are preferably monodispersed, e.g., the diameter of the dot varying approximately less than 10% between quantum dots in the preparation.

In certain embodiments, the quantum dots have a quantum yield of more than 10%. More typically, the quantum yield is more than 20%. More typically, the quantum yield is more than 40%. "Quantum yield" is a direct measure of the light-emitting efficiency of a fluorophore. It can be quantified as the ratio between the photon emitted and the photons absorbed to produce the excited state from which the emission originates.

In certain embodiments, the quantum dots have a fluorescence lifetime of more than 5 ns, more than 20 ns, more than 40 ns. "Fluorescence lifetime" refers to the average time a fluorophore remains in the excited state, typically ranging from femtoseconds to nanoseconds. Quantum dots are generally marked with much longer fluorescence lifetimes and are therefore more photostable than the typical organic dyes.

In other embodiments, the quantum dots can be conjugated to a biomolecule. "Biomolecule" refers to a carbon-based organic molecule of a biological origin or an organic molecule that mimics or resembles biological activities, properties and interactions. Biomolecules have shown affinities for a variety of substrates, including metal substrates. Accordingly, quantum dots conjugated to a biomolecule exhibit improved adhesion to the substrates. Detailed description of biomolecule-quantum dot conjugates can be found, e.g., in U.S. Provisional Application No. 60/889,703 entitled "Fluorescent particles bound to multifunctional scaffolds and their uses," filed Apr. 14, 2006, in the name of Cambrios Technologies Corporation, which reference is incorporated herein in its entirety.

Typically, quantum dots can be surface-functionalized with a functional group, e.g., an amino group ($—NH_2$), which forms a covalent bond with a biomolecule. Exemplary biomolecules include proteins and peptides. In one embodiment, the quantum dots are conjugated to a protein, e.g., streptavidin. In another embodiment, the quantum dots are conjugated to a peptide.

Examples of the semiconductor quantum dots include, but are not limited to: a semiconductor material selected from a Group IIB-VIA compound, a Group IIB-VA compound, a Group IIIA-VIA compound, a Group IIIA-VB compound, a Group IVA-VIA compound, a Group IB-IIIA-VIA compound, a Group IIB-IVA-VIA compound, and a Group IIB-IVA-VA compound. A "Group IIB-VIA compound" refers to a compound formed by an element selected from Group IIB and an element selected from Group VIA of the Periodic Table. The designation of the Group numbers in the Periodic Table is according to the CAS (Chemical Abstract Service) convention and is known to one skilled in the art. For example, Group IIB refers to the group of transitional elements (designated by B) having two electrons in the valence shell, whereas Group VIA refers to the group of main group elements (designated by A) having six electrons in the valence shell. Examples of Group IIB-VIA compounds include ZnS, ZnSe, ZnTe, CdS, CdSe, CdTe, HgS, HgSe and HgTe.

According to the same naming convention as described above, additional examples of the semiconductor quantum dots include, but are not limited to: AlN, AlP, AlAs, AlSb, GaN, GaP, GaAs, GaSb, GaSe, InN, InP, InAs, InSb, TlN, TlP, TlAs, TlSb, PbS, PbSe, PbTe, and mixtures thereof.

Typically, semiconductor quantum dots assume a core/shell structure, in which the above semiconductor material forms a core that is passivated with a different semiconductor material. Passivating the surface of the core quantum dot can result in an increase in the quantum yield of the fluorescence emission, depending on the nature of the passivation coating. Typical shell materials include ZnS and CdS. These quantum dots of the core/shell structure can also be represented by, for example, CdSe/ZnS, CdTe/ZnS and CdTe/ZnS.

The semiconductor quantum dots can be prepared by known methods in the art. For example, they can be synthesized according to the methods described in, e.g., Klimov, V. I., Semiconductor and Metal Nanocrystals: Synthesis and Electronic and Optical Properties (Optical Engineering) (*CRC*, Nov. 7, 2003), Li, L. H. et al., (2004) *Nano Lett.* 4:1, 2261-2264, and Battaglia, D. et al., (2002) *Nano Lett.* 2:9, 1027-1030.

In addition, quantum dots can be fabricated through biological means. In particular, biological materials such as viruses and proteins can function as templates to create quantum dots. In certain embodiments, the dimensions of the quantum dots thus created correlate to the dimensions of the biological templates. In other embodiments, the biological templates can be engineered to exhibit selective affinity for particular types of semiconductor material. More detailed description of biofabrication of quantum dots can be found in, e.g., Mao, et al. (2003) *PNAS* (supra), and U.S. Published Application 2005/0130258.

Commercial sources including Evident Technologies (Troy, N.Y.) and Invitrogen (Carlsbad, Calif.) also provide a wide range of quantum dot material systems. Quantum dots are typically characterized with emission profiles having narrow bandwidth (FWHM ~30 to 45 nm). Commercial quantum dots customarily include the peak emissions in their labeling. For example, quantum dots comprising CeSe/ZnS in a core/shell structure are sold by Invitrogen under the trademark Qdot®655, which have an emission peak at 655 nm and glows bright red when illuminated with UV light. Likewise, quantum dots comprising CeSeTe/ZnS in a core/shell structure are sold by Invitrogen under the trademark Qdot®800, which have an emission peak at 800 nm and can be viewed with night vision goggles.

Examples of the metallic quantum dots include, but are not limited to: a noble metal selected from gold (Au), silver (Ag) and copper (Cu). Fluorescent metal clusters can be prepared according to the methods described in, for example, Dickson, R. M. et al., (2004) *Physical Rev. Lett.* 93:7, 077402. Gold nanodots of discrete sizes have been synthesized by reducing a gold salt in the presence of poly(amidoamine) dendrimers. Dickson, R. M. (Supra). Similarly, individual silver nanodots ($Ag_2$-$Ag_8$) have been prepared through photo-activated reduction, also in the presence of poly(amidoamine) dendrimers. Dickson, R. M. et al. (2002) *J. Am. Chem. Soc.* 124, 13982-13983. More recently, the formation of silver nanoclusters using DNA as templates was reported. Dickson, R. M. et al. (2004) *J. Am. Chem. Soc.* 126:16, 5207-5211.

The amount of the quantum dots in the formulation depends upon the desired fluorescence intensity, which in turn directly correlates to the quantum yields of the specific quantum dots. In various embodiments, quantum dots are present in the formulation at a concentration of about 1 nM-500 nM, about 1 nM-100 nM, or about 20 nM-50 nM.

2. Quenching-Preventive Agent

A quenching-preventive agent is an additive to the quantum dot formulation to prevent the quenching of the fluorescence of the quantum dots. "Quenching", as used herein, refers to a process that reduces the fluorescence quantum yield of the quantum dots. The quenching may result from a transient interaction with the excited state quantum dots by another molecule, referred herein as a "quencher". For example, a quencher may collide with excited state quantum dots and divert the energy from the excited state. The quenching may also result from a formation of a non-fluorescent steady state complex between a quantum dot and a quencher.

Regardless of the exact mechanism, it has been observed that certain metal ions are efficient quenchers of the quantum dots. The quenching-preventive agent therefore targets the metal ions by either sequestering any metal ions or preventing the release of any metal ions from a metal substrate. Thus, in various embodiments, the quenching-preventive agent is a metal ion scavenger, a corrosion inhibitor, or a combination thereof.

a. Metal Ion Scavenger

"Metal ion scavenger" refers to a chemical compound that readily binds with or converts a metal ion to a stable complex. In the presence of the metal ion scavenger, trace amount of the metal ions can be sequestered or removed such that the fluorescence of the quantum dots can be preserved.

An exemplary metal ion scavenger is a metal chelating agent. "Metal chelating agent" refers to a chemical compound capable of forming a coordination complex with a metal ion. The metal chelating agent typically possesses two or more lone pair electrons, which form two or more coordinate bonds with the unfilled orbitals of a metal ion. Metal ions include, but are not limited to, transitional metal ions and non-transition metal ions. Exemplary transition metal ions include $Cu^{2+}$, $Fe^{2+}$, $Fe^{3+}$, $Cr^{3+}$, $Ni^{2+}$ and $Co^{2+}$. Examples of non-transition metal ions include $Ca^{2+}$, $Mg^{2+}$, $Al^{3+}$, and $Zn^{2+}$.

Metal chelating agents are well known in the art. In certain embodiments, the metal chelating agent comprises at least two organic acid moieties. Exemplary organic acid moieties include carboxylic acid ($COO^-$) and phosphonic acid ($PO_3^{2-}$). The metal chelating agent may further comprise additional functional groups that present lone pair electrons, including amines (including primary, secondary or tertiary amines), hydroxy (—OH) or thiol (—SH) moieties.

Suitable metal chelating agents must not interfere with the spectral properties of the quantum dots. For example, a metal chelating agent should be spectrally clear, i.e., they do not emit detectable fluorescence or absorb in the visible and near IR region.

Examples of metal chelating agents are (ethylenedinitrilo) tetraacetic acid (EDTA), butylenediaminetetraacetic acid, (1,2-cyclohexylenedinitrilo)tetraacetic acid (CyDTA), diethylenetriaminepentaacetic acid, ethylenediaminetetrapropionic acid, (hydroxyethyl)ethylenediaminetriacetic acid (HEDTA), N,N,N',N'-ethylenediaminetetra(methylenephosphonic)acid (EDTMP), triethylenetetraminehexaacetic acid (TTHA), 1,3-diamino-2-hydroxypropane-N,N,N',N'-tetraacetic acid (DHPTA), methyliminodiacetic acid, propylenediaminetetraacetic acid, 1,5,9-triazacyclododecane-N,N',N"-tris(methylenephosphonic acid) (DOTRP), 1,4,7,10-tetraazacyclododecane-N,N',N",N'''-tetrakis(methylenephosphonic acid) (DOTP), nitrilotris(methylene) triphosphonic acid, diethylenetriaminepenta (methylenephosphonic acid) (DETAP), aminotri (methylenephosphonic acid), 1-hydroxyethylene-1,1-diphosphonic acid, bis(hexamethylene)triamine phosphonic acid, 1,4,7-triazacyclononane-N,N',N"-tris(methylenephosphonic acid (NOTP), 2-phosphonobutane-1,2,4-tricarboxylic acid, nitrolotriacetic acid (NTA), citric acid, tartaric acid, gluconic acid, saccharic acid, glyceric acid, oxalic acid, phthalic acid, maleic acid, mandelic acid, malonic acid, lactic acid, salicylic acid, 5-sulfosalicylic acid, catechol, gallic acid, propyl gallate, pyrogallol, 8-hydroxyquinoline, and cysteine.

A preferred metal chelating agent is EDTA. EDTA is a versatile chelating agent that can form 2-6 coordination bonds with a metal ion. It has four carboxylic acids and two tertiary amines that can complex with a metal ion ($M^{n+}$), as shown in Scheme 1. EDTA forms particularly stable complex with $Cu^{2+}$, $Fe^{3+}$ and $Co^{2+}$.

SCHEME 1

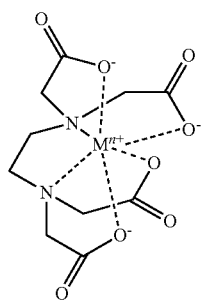

In certain embodiments, the metal chelating agent is present in the formulation at a molar concentration of about 1 mM-5 mM, about 1 mM-30 mM or about 5 mM-15 mM. Typically, if the concentration reaches beyond 50 mM, the metal chelating agent leaves a salt residue on the substrate.

Other metal ion scavengers include inorganic ions (e.g., phosphate) that form stable salts with the metal ions. In another embodiment, metal ion scavengers may further include biomolecules, such as proteins. For example, metallothionein forms stable complexes with copper, zinc, silver ions and the like, see, e.g., *Eur. J. Biochem.* (2000) 267(4): 1008-18.

b. Corrosion Inhibitor

In other embodiments, the quenching-preventive agent is a corrosion inhibitor. According to one mechanism, the corrosion inhibitor binds readily to certain metals and forms a protective film on a metal surface. The binding stabilizes the metal surface and prevents the dissolution of metal ions. The protective film further acts as a barrier to seal off the metal surface from corrosive environmental factors such as moisture, trace amount of acids, oxygen, sulfur and the like.

Certain nitrogen-containing and sulfur-containing organic compounds have been demonstrated to form stable complexes on a metal surface. These complexes can act as barriers between the metal and its environment. Benzotriazole (BTA) is a common organic corrosion inhibitor for copper or copper alloys. Additional suitable examples of corrosion inhibitors include, but are not limited to: 2-aminopyrimidine, 5,6-dimethylbenzimidazole, 2-amino-5-mercapto-1,3,4-thiadiazole, 2-mercaptopyrimidine, 2-mercaptobenzoxazole, 2-mercaptobenzothiazole, dithiothiadiazole, and 2-mercaptobenzimidazole.

Other exemplary corrosion inhibitors include alkanethiols. Alkanethiols are typically straight-chain alkanes substituted with a terminal thiol group. They can be represented by formula $C_nH_{2n+1}SH$, n is an integer of at least 6, 10, 12, 18, 20 or 24. Alkanethiols can self-assemble on a metal surface to form a monolayer, thereby protecting the metal surface from corroding.

In certain embodiments, the corrosion inhibitor is present in the formulation at about 1 mM-50 mM. In other embodiments, the corrosion inhibitor is present in the formulation at about 5 mM-20 mM. Preferably, the corrosion inhibitor is present in the formulation at about 10 mM.

In other embodiments, the corrosion inhibitor can be used in combination with a metal ion scavenger, e.g., a metal chelating agent. The respective amounts of the corrosion inhibitor and the metal ion scavenger can be optimized to prevent the quenching of the quantum dots in the presence of the metal ions.

3. Carrier Material

As noted herein, the quantum dots and the quenching-preventive agent are formulated with a carrier material. The carrier material assists the application or deposition of the quantum dot formulation on a substrate.

"Carrier material" therefore refers to a fluid medium that provides a stable suspension of the quantum dots and the quenching-preventive agent. The carrier material comprises one or more solvents, and may further comprise a binder material.

The exact composition of the carrier material can be optimized by selecting the solvents and/or binder material that are non-corrosive, and are capable of dispersing all the constituents of the formulation despite their diverse chemical natures. It is further desirable that the carrier material has low environmental impact (e.g., non-toxic and low odor).

a. Solvent

In certain embodiments, the carrier material comprises a solvent. A solvent, or "solvent system", as used herein, refers to one or more liquids that disperse the quantum dots and the quenching-preventive agent or agents. This solvent system may also be removed after the application of the quantum dots on the substrate.

In certain embodiments, the solvent is volatile, having a boiling point of no more than 200° C., no more than 150° C., or no more than 100° C. Advantageously, volatile solvents can be rapidly removed from the metal surface. This reduces the duration of the metal's exposure to the solvent, and results in no or less dissolution of the metal.

In one embodiment, the solvent is a polar solvent. As described herein, metal chelating agents typically comprise organic acid moieties and therefore disperse easily in a polar solvent. In one embodiment, the polar solvent is water. In other embodiments, the polar solvent is an alcohol. Exemplary alcohols include, but are not limited to, methanol and ethanol. In other embodiments, the polar solvent is a ketone. Exemplary ketones include, but are not limited to, acetone and methyl ethyl ketone (MEK).

The solvent(s) can be chosen to minimize the amount of metal ions released from the substrate. Typically, water tends to be more corrosive than an organic solvent such as an alcohol. An alcohol, on the other hand, is a poor solvent with respect to a binder material (e.g., a polymer), as defined herein. Therefore, according to certain embodiments, a mixture of water and an alcohol can achieve an optimal level of solubility and reduction of the corrosiveness of water. Advantageously, the boiling point of a water-alcohol mixture is lower than that of either water or the alcohol. The enhanced volatility further allows rapid evaporation of the solvents. For example, a solution comprising equal amounts of water and methanol (1:1) is a superior solvent system than either water or methanol alone.

In another embodiment, the solvent is a non-polar solvent. Examples of the non-polar solvents include, but are not limited to, aliphatic solvents (e.g., saturated hydrocarbons) and/or aromatic solvents (unsaturated hydrocarbons.) Exemplary non-polar solvents include mineral spirits, such as hexane, xylene, toluene and the like.

b. Binder Material

In other embodiments, the carrier material may further comprise a binder material. "Binder material" refers to a chemical substance that adheres to both the quantum dots and a substrate, thereby binding the quantum dots to the substrate. Typically, the binder material is non-volatile and remains on the substrate after the solvents are removed. Furthermore, the binder material should not interfere with the spectral properties of the quantum dots.

An exemplary binder material is a polymer. The polymer is miscible with the solvent system to form a stable mixture in the form of a solution, a suspension, or an emulsion.

The concentration of the polymer is selected such that a sufficient amount of the polymer can bind the quantum dots to the substrate or further act as a spacer to minimize quenching interactions. In one embodiment, the concentration of the polymer may be high enough to form a clear coating layer (e.g., a lacquer) on a metal substrate once the solvent system evaporates. The coating layer not only improves the environmental stability of the quantum dots embedded therein, but also seals the metal substrate to prevent any further dissolution or corrosion of the metal. It further provides some physical spacing between the quantum dots and the metal substrate to minimize quenching interactions. In various embodiments, the polymer has a concentration of about 0.1%-20%, about 2%-15% or about 3%-10% of the formulation.

In certain embodiments, the polymer is miscible or forms an emulsion in water. Examples of these water-borne polymers include, but are not limited to: polyacrylic acid, polyurethane, polyacrylates (latexes), poly(alkylene oxide), cellulose, proteins, polynucleic acids, hydrogels, epoxies, polyvinyl alcohol, or their copolymers and derivatives. These polymers can be prepared by known methods in the art.

Suitable polymer-based binder materials are also available from several commercial sources. These commercial polymer formulations already contain certain amount of solvent(s) known to be compatible with the solvent system chosen for the quantum dot formulations, as described herein. For example, a mixture of polyacrylate and polyurethane is sold under the trademark Polycrylic® as a commercial water-based topcoat (Minwax, Upper Saddle River, N.J.). Additionally, polyurethane is sold under the trademarks Varathane® Water-based Outdoor Spar Urethane paint and Varathane® Diamond Water-based Finish by Rust-Oleum Corporation (Medina, Ohio). In various embodiments, these polymers can be present in the quantum dot formulations at about 10% by weight.

B. Method of Making the Quantum Dot Formulation

It is further described herein a method of preparing the formulations described above. In certain embodiments, the method comprises: combining a plurality of quantum dots and a quenching-preventive agent in a carrier material. In certain embodiments, the carrier material is first prepared by any known methods in the art. For example, one or more solvent can be combined with a binder material to form a solution or an emulsion. Thereafter, the method further comprises mixing a quenching-preventive agent with the carrier material, and suspending a plurality of quantum dots in the carrier material.

Table 1 shows a number of exemplary formulations comprising various concentrations of quantum dots (e.g., Qdot® 655 or Qdot® 800), a metal chelating agent (e.g., EDTA), a corrosion inhibitor (e.g., BTA or dithiothiadiazole), and a carrier material.

TABLE 1

| Formulations | Qdot ® 655 (nM) | EDTA (mM) | BTA (mM) | carrier material |
|---|---|---|---|---|
| 1 | 20 | 5 | 0 | water |
| 2 | 20 | 6 | 0 | water |
| 3 | 20 | 17 | 0 | water |
| 4 | 20 | 50 | 0 | water |
| 5-8 | 20 | 5 | 0 | Polycrylic ®:water (1:1, 1:2, 1:3, 1:10) |
| 9 | 20 | 5 | 0 | methanol (MeOH) |
| 10 | 20 | 5 | 0 | ethanol |
| 11-14 | 20 | 5 | 0 | Polycrylic ®:MeOH (1:2, 1:4, 1:10, 1:20) |
| 15 | 20 | 5 | 0 | Water:MeOH(1:1), 10% Polycrylic ® |
| 16 | 50 | 5 | 10 | Water:MeOH(1:1), 10% Polycrylic ® |
| 17 | 20 | 5 | 10 | Water:MeOH(1:1), 10% Varathane ® |
| 18 | 20 | 5 | 10[1] | Water:MeOH(1:1), 10% Polycrylic ® |

TABLE 1-continued

| Formulations | Qdot® 655 (nM) | EDTA (mM) | BTA (mM) | carrier material |
|---|---|---|---|---|
| 19 | 20 | 0 | 10 | Water:MeOH(1:1), 10% Polycrylic® |
| 20 | 50[2] | 5 | 0 | Water:MeOH(1:1), 10% Polycrylic® |
| 21 | 50[2] | 5 | 10 | Water:MeOH(1:1), 10% Polycrylic® |

[1]The corrosion inhibitor is dithiothiadiazole.
[2]The quantum dots are Qdot800.

Table 2 shows a number of exemplary formulations comprising various concentrations of Qdot® 655 conjugated to a biomolecule, a metal chelating agent (e.g., EDTA), and a carrier material.

TABLE 2

| Formulations | Qdot® 655-Biomol. (nM) | EDTA (mM) | carrier material |
|---|---|---|---|
| 22 | 20[3] | 50 | water |
| 23 | 20[4] | 2.5 | water |
| 24 | 20[4] | 25 | water |
| 25 | 20[5] | 2.5 | water |
| 26 | 20[5] | 25 | water |

[3]The biomolecule is streptavidin.
[4]The biomolecule is C-GGGRSGRRRSHHHRL.
[5]The biomolecule is APHVPVLSRYPDGGGS-C.

The formulations prepared above are stable in a range of temperature and show varying degrees of quenching-prevention, as will be further discussed in connection with the examples.

C. Method of Using the Quantum Dot Formulation

The quantum dot formulations described herein are suitable for depositing quantum dots on a variety of substrates. In particular, the quenching-preventive agent (e.g., metal chelating agent and/or corrosion inhibitor) in the formulation prevents the quantum dots from being quenched by a metal substrate.

Thus, in certain embodiments, it is described herein a method comprising: providing a formulation having a plurality of quantum dots, a quenching-preventive agent, and a carrier material; and applying the formulation to a substrate.

The carrier material is a fluid as described herein, including one or more solvents (e.g., water and/or an alcohol) and optionally a binder material. The binder material can be a polymer.

The formulation can be sprayed, coated, deposited, pressed, printed or otherwise applied to the substrate.

In certain embodiments, the substrate is metallic. Examples of the suitable metal substrates include, but are not limited to: copper, copper alloys, iron, iron alloys, aluminum, nickel, silver or zinc. In other embodiments, the substrate can be glass, fabric or a polymer composite material.

In particular, quantum dots that otherwise would have been substantially quenched by copper alloys such as brass (Cu—Zn alloy), bronze (Cu—Ni alloy), and iron alloys such as steel (Fe—C alloy), have their fluorescence intensities preserved in the presence of the quenching-preventive agent.

The formulation can be applied to the metal substrate by drop-depositing, spraying, printing, brushing or any other known methods of deposition. It is noted that different techniques of application may require different customization of the formulations. For instance, Formulation 15 (Table 1) was drop-deposited on a brass substrate and the fluorescence of the quantum dots were preserved due to the presence of the metal ion scavenger, i.e., EDTA. Spraying the same formulation on the same brass substrate, however, resulted in a complete quenching of the fluorescence. It is believed that, because the spraying process spread the formulation in a much larger area than the drop deposition process did, the amount of EDTA per unit surface area is therefore much lower for the sprayed substrate. One option to restore the fluorescence in a spraying formulation is to increase the concentration of EDTA. The other option is to add a corrosion inhibitor to the spraying formulation (e.g., Formulation 17). The corrosion inhibitor (e.g., BTA) forms a stable complex on the surface of the brass and reduces the release of the copper ions. Thus, the combination of a metal chelating agent and a corrosion inhibitor effectively prevents the quantum dots quenching.

Following the application step, the method may further comprise drying the formulation by allowing the polar solvent to evaporate. The drying process may further play a role in preventing the quenching of the quantum dots. It has been observed that the faster the drying process the less the quantum dots are quenched on a metal surface. The fast elimination of the solvent correlates to a reduced rate of corrosion and diffusion of any released metal ions. In certain embodiments, a volatile solvent such as methanol, either alone or mixed with water, provides a suitable carrier material.

The formulation can be air-dried or heated to speed up the drying process. Typically, the temperature of the heating can be maintained at about 40-70° C., or at about 50-60° C., without compromising the physical and chemical integrities of all the constituents in the formulation.

In a further embodiment, the method comprises irradiating the quantum dots on the substrate with an excitation energy. As noted herein, the quantum dots are invisible under normal lighting condition, i.e., they do not emit detectable fluorescence. Once irradiated with an excitation energy, e.g., ultraviolet light, the quantum dots emit fluorescence in the visible and/or near IR range (about 400 nm to about 1400 nm).

In yet another embodiment, the method further comprises detecting any fluorescence emitted by the quantum dots. Depending on the emission profiles of the quantum dots, the fluorescence can be detected by direct visualization or by an optical detector. Optical detectors are known to one skilled in the art. Suitable optical detectors include thermographic detectors such as night vision goggles or near-IR viewers or cameras for detecting emissions in the near IR region.

In certain embodiments, the method thus provides a means to identify an object by a fluorescence pattern affixed thereto. Details of using quantum dots-based fluorescence pattern for identification and authentication are described in Applicants' copending application entitled "Fluorescent particles bound to multifunctional scaffolds and their uses", supra.

The formulations and the methods are described in more detail in connection with the following non-limiting examples.

EXAMPLES

Example 1

FIG. 1 is a graph illustrating the difference between the fluorescence of quantum dots in a standard formulation and a formulation with chelating agents added. In the graph, the amount of fluorescence for the different formulations is shown for various concentrations of $CuSO_4$ using quantum dots, which fluoresce at 655 nanometers wavelength. The left-hand bar of each pair of bars shows the amount of fluorescence in the formulation for different concentrations of $CuSO_4$ without a chelating agent and on the right-hand side of each pair of bars, the amount of fluorescence of the quantum dots with a chelating agent present.

In the first bar of the graph, the fluorescence level 1 is approximately 1,200 for a suspension composed of water and quantum dots emitting at 655 nanometers. On the right-hand side 10 of the first bar, a chelating agent has been added, increasing the fluorescence to approximately 1,300. In this first example, no $CuSO_4$ has been added to the formulation. The formulation is pure water with the quantum dots at an appropriate concentration, such as 20 nM. In the second bar 2, an amount of $CuSO_4$ has been added to the formulation at a value of $1\times10^{-8}$ M. This resulted in a slight reduction of fluorescence to approximately 1,100 in which no chelating agent was added (bar 2). Where a chelating agent is present, the fluorescence level remains approximately stable at approximately 1,300 (bar 11). When more $CuSO_4$ is present in the formulation, such as in the fourth bar 4 having $10^{-6}$ M of $CuSO_4$, the fluorescence drops by more than half to less than 600 without a chelating agent present, but with a chelating agent present, the fluorescence only reduces slightly and is still approximately 1,300, bar 13. As additional $CuSO_4$ is added, such as $10^{-5}$ or $10^{-4}$ M, the fluorescence of the quantum dots continues to decrease, so that at a concentration of 0.001 or 0.01 M, the fluorescence is approximately zero when no chelating agent is present. However, if a chelating agent has been added to the formulation, the fluorescence remains nearly stable in the presence of $CuSO_4$ ranging from 0 to 0.01 M.

Other appropriate chelating agent can be added to bind with the metals on the substrate to which the quantum dot formulation is to be applied, as described herein. Accordingly, as illustrated in FIG. 1, bars 1-8 have no chelating agent added and the florescence sharply decreases as quantities of copper-containing elements are present in the formulation. On the other hand, as shown in bars 10-17 if a chelating agent such as EDTA or the like is present in the formulation prior to the quantum dots being added, then the fluorescence remains high and is generally unaffected by the presence of the metal ion.

Example 2

Figure 2:
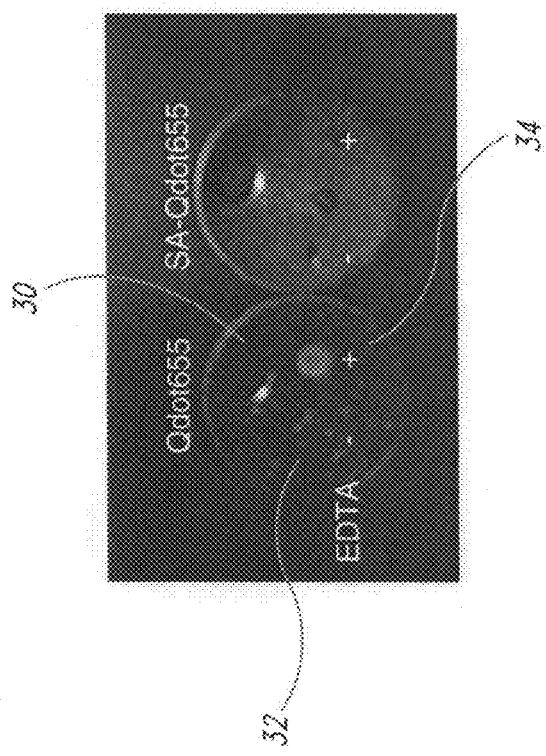
FIG. 2 is a photograph of an example of formulations with and without chelating agents added to the quantum dot formulation.

FIG. 2 illustrates two droplets of quantum dot formulations applied to a brass marker, one droplet having a chelating agent and the other does not have a chelating agent present. In the specific example of FIG. 2, quantum dots exhibiting fluorescence at 655 nanometers were suspended in water at a strength of 20 nM. In the first example shown on the left, no chelating agent was added and in the example shown on the right, a chelating agent was added to the formulation. In the embodiment of FIG. 2, the chelating agent added was 50 mM of EDTA. Each of the two formulations was then applied to a brass marker 30 as illustrated in FIG. 2. The application to the brass tag 30 was made by a droplet of 10 μl of the respective quantum dot formulations on the brass marker, after which it was allowed to air dry. The formulation without the chelating agent is in region 32 on the left-hand side of the tag 30, and the formulation with the chelating agent is in region 34. The marker was then exposed to ultraviolet light in order to determine the efficacy of the chelating agent in preventing the quenching of the quantum dots on the brass substrate. As can be seen in FIG. 2, the droplet without the chelating agent did not fluoresce and was not visible. Therefore, it could not be used as a taggant as shown at region 32. The droplet containing the chelating agent was visible and could be effectively used as a quantum dot-based taggant, which fluoresced under ultraviolet light.

One of the important characteristics of the taggants is that they be invisible under normal light conditions. If too high a concentration of chelating agent is added, it may leave a small amount of a salt residue on the substrate after the droplet of the quantum dot formulation is dried. Accordingly, it is desired to have as low a concentration of the chelating agent as reasonable in order to maintain the invisibility of the quantum dot formulation applied to the substrate.

Example 3

Figure 3:
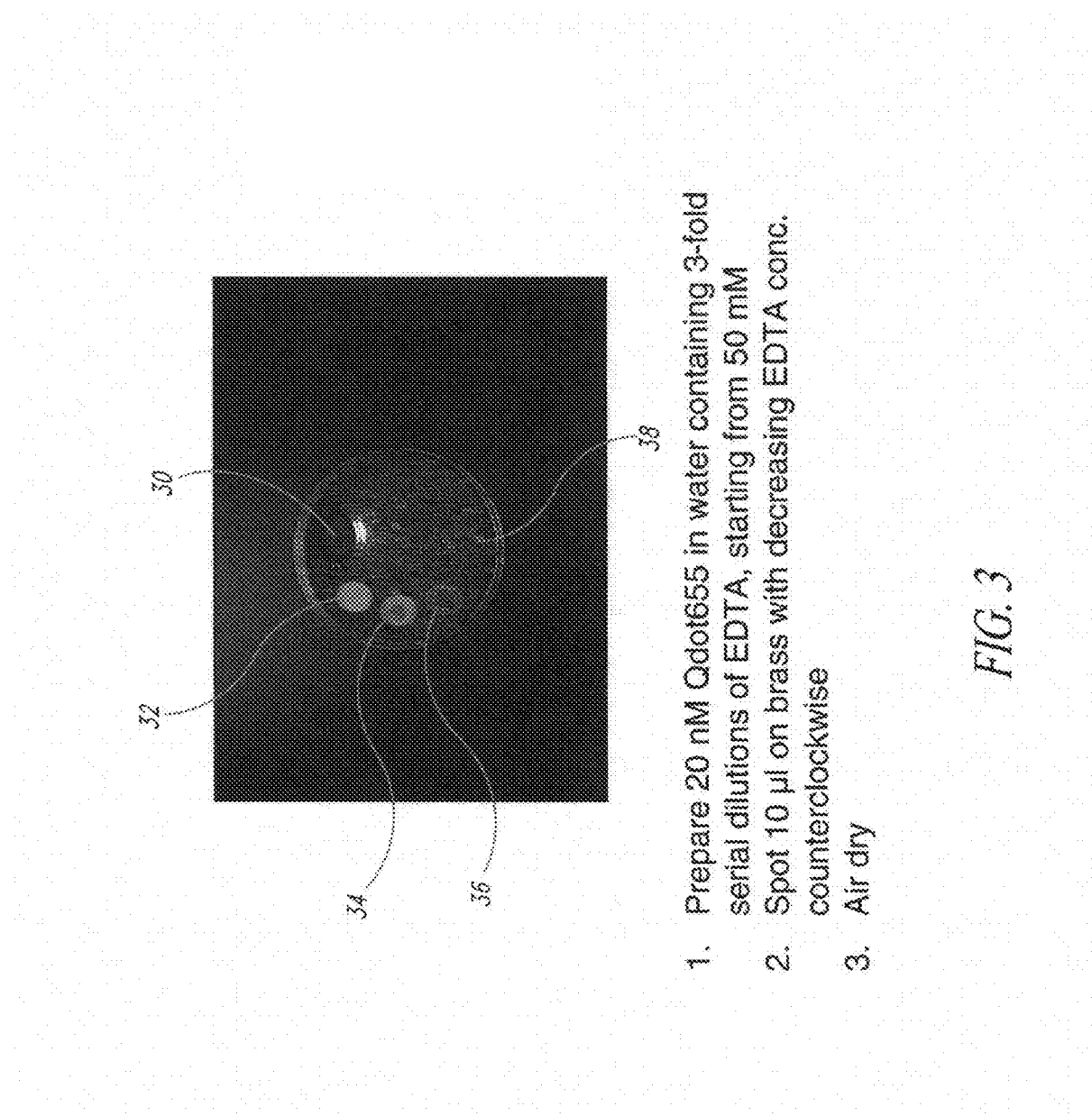
FIG. 3 shows examples of different concentrations of the chelating agent in a formulation of quantum dots.

FIG. 3 illustrates examples of different quantities of the chelating agent being added to the formulations in order to test a preferred level of chelating agent to be added to a formulation. According to the example as shown in FIG. 3, 20 nM of quantum dots that fluoresced at 655 nanometers were suspended in a carrier material (e.g., water). Various concentrations of the chelating agent were added to the fluid. Each of the formulations was applied to the brass tag 30 in order to test the efficacy of different levels of the chelating agent present in the formulation. The brass tag 30 was thereafter exposed to ultraviolet light and the photograph taken as shown in FIG. 3. In the first formulation as shown in region 32, chelating agent to a strength of 50 mM of EDTA was present. In the formulation in the second region 34, a strength of approximately 17 mM of EDTA was present. In the formulation which was deposited at the third location 36, approximately 6 mM of EDTA were present, and in the formulation appearing at the fourth location 38, approximately 2 mM of EDTA was present. Accordingly, four different samples were deposited on the brass tag 30, each formulation having a different concentration of the chelating agent present in order to test the desired concentration.

As shown in FIG. 3, formulations having a higher concentration of chelating agents, 17 mM and higher, are somewhat more effective than lower concentrations. However, concentrations in the 5 mM range can still reduce the quenching effects of the metal ion to the quantum dots. The deposits of formulations containing higher concentrations, above 50 mM may become visible by eye under normal light due to the higher concentration of the chelating agent upon drying. Accordingly, it is desired to have as low a chelating agent as possible so as to maintain the invisibility of the taggant.

Example 4

Figure 4:
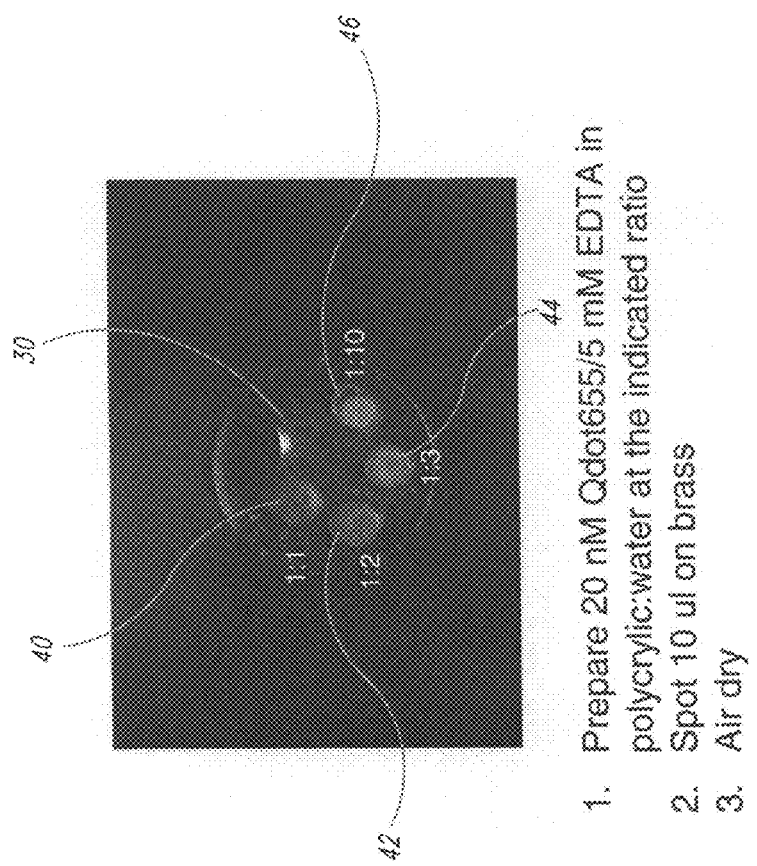
FIG. 4 shows quantum dots applied to a metal with varying concentrations of a mixture of polyacrylate, polyurethane and water for a particular chelating agent.

FIG. 4 illustrates the effects of different types of carrier materials for the quantum dot fluorescence. In particular, FIG. 4 illustrates different formulations of quantum dots in Polycrylic® (Minwax, Upper Saddle River, N.J.) and water for testing the efficacy of various ratios of the polymer. According to the working example of FIG. 4, formulations having different concentrations of Polycrylic® and water were obtained at different ratios of the two components. The ratios included ratios of Polycrylic®:water of 1:1; 1:2; 1:3; and 1:10. To each of the different formulations of Polycrylic® and water were added 20 nM of quantum dots emitting light at 655 nanometers, and also added were 50 mM of a chelating agent. In the working example provided, EDTA was the chelating agent. A spot of 10 μl of fluid was then applied to the brass marker 30.

After each of the formulations was applied to the brass marker 30, it was allowed to dry for a period of time after which the tag was subjected to ultraviolet light and the results photographed as shown in FIG. 4. The formulation having a ratio of 1:1 was deposited in the region 40 and exhibited a slight fluorescence when exposed to ultraviolet light. The formulation having a ratio of 1:2 was deposited in the region 42 and exhibited a somewhat strong fluorescence when subjected to ultraviolet light. The formulation having a ratio of 1:3 was deposited in the region 44 and exhibited a stronger yet fluorescence. The formulation having a ratio of 1:10 was deposited in the region 46 and provided the strongest photoluminescence response of the formulations being tested. In further tests, photographs of which are not shown, additional ratios were provided such as 1:20, 1:30, and the like. At ratios of 1:20, slightly stronger photoluminescence was exhibited of the quantum dots. One of the goals is that the taggant is to be invisible (i.e., it does not fluoresce when irradiated by visible light), so the ratio of Polycrylic®:water is to be selected in order to ensure that the taggant remains invisible under all conditions except under the appropriate ultraviolet light when detection is desired. Accordingly, a preferred ratio for the formulation is a Polycrylic®:water at a ratio of 1:10 having 5 mM of a chelating agent, such as EDTA, added for a brass substrate. For substrates of copper, iron, or stainless steel, the ratios may vary slightly and, given the teachings herein, can be easily selected based on work by one of skill in the art.

As illustrated in FIG. 4, a chelating agent is also effective in the presence of a binder material, such as Polycrylic®. More dilute formulations of the Polycrylic® with added water provide better results. The binder material is added to provide high adhesion of the quantum dots to the target for taggant applications. It is thus advantageous to use some adhering agents, such as Polycrylic®, to greatly increase the adherence and long-term stability of the taggant on the target, even though it is subjected to a number of exposures to abrasives, temperature variations, or different weather conditions such as snow, rain, and the like.

Example 5

Figure 5:
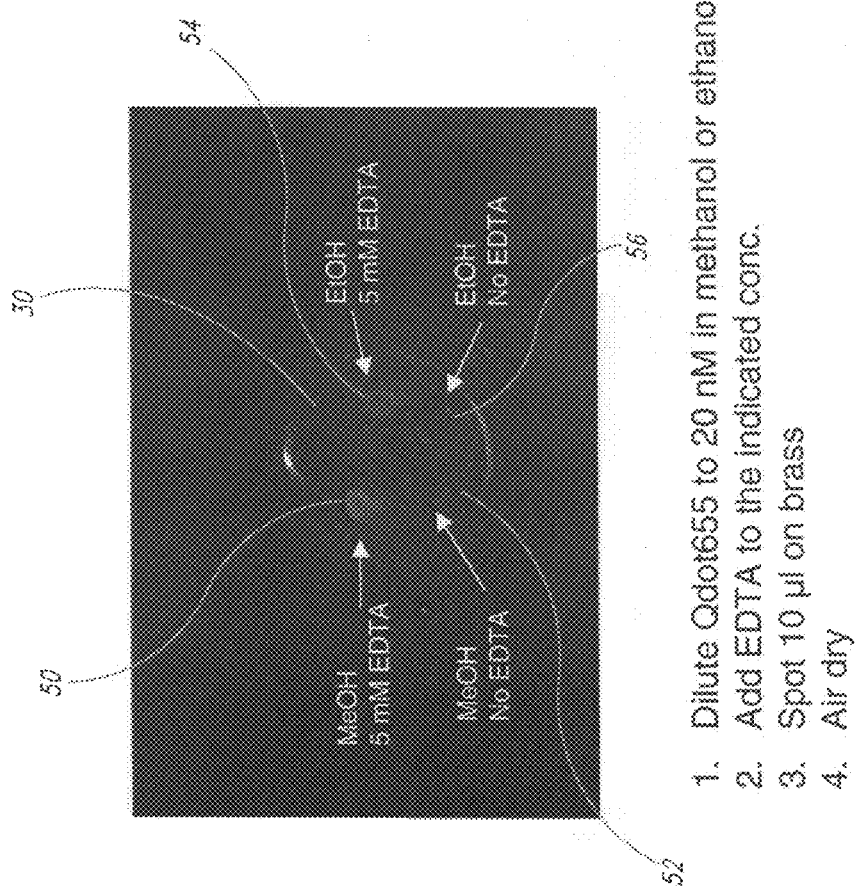
FIG. 5 illustrates the quantum dots suspended in methanol or ethanol.

FIG. 5 illustrates different fluids being used as the carrier materials for the quantum dots. In the working example of FIG. 5, four different formulations were applied to a brass tag 30, each of the formulations having a carrier material of different composition. A first carrier material is pure methanol and a second formulation is pure ethanol. In addition, to each of the formulations a chelating agent was present in one of the examples and not present in the other example. Four formulations were therefore made, two of pure methanol, one having a chelating agent present and the other not having a chelating agent present. Similarly, two formulations of pure ethanol were made, one with and one without the chelating agent. A formulation of methanol having 5 mM of a chelating agent added was deposited in the region 50. A formulation of methanol with no chelating agent present was deposited in the region 52. A formulation of ethanol having a chelating agent present was deposited in region 54 and a formulation of ethanol having no chelating agent was deposited in the region 56. The brass tag was thereafter subjected to ultraviolet light and the results photographed in FIG. 5. The quantum dot formulations were applied using the previously indicated technique of placing a drop of 10 µl of the formulation containing the quantum dots at the respective locations on the brass tag 30. The brass tag was then allowed to air dry after which it was exposed to ultraviolet light.

As can be seen in FIG. 5, the formulations of pure ethanol have a low efficacy for exhibiting the fluorescence properties of the quantum dots. The formulation of methanol without the chelating agent also has a low efficacy for exhibiting the quantum dots. The formulation in which the chelating agent is present in the methanol has a high degree of efficacy for the illustration of the quantum dots when applied to a brass tag.

Another test for the quantum dots is their long-term adhesion to the object to which they are applied. When the quantum dots are applied to the object, they must remain strongly adhered to the object for long periods of time, even though they might be subjected to touching, abrasive rubbing, or other techniques which may cause it to be removed from the object. Accordingly, a formulation which results in a high adhesion of the quantum dots to the target and which cannot easily be removed, even when subjected to abrasive conditions, is desirable. FIGS. 6A-6D illustrate an example of different formulations subjected to various abrasive tests in order to test the adhesive qualities of the quantum dots to the target.

As shown in FIG. 5, nonaqueous formulations, such as methanol, ethanol, or other alcohols can be used in the formulation for the taggant formulation. The use of these different formulations can reduce the number of metal ions released from the surface of the target which will allow the use of lower concentrations of the chelating agent while still providing high visibility. In addition, the use of alcohols or other different solvents provide substantially faster drying time of the taggant formulation. Methanol appears to be more effective than ethanol, possibly due to the better adhesion to the target and also the higher solubility of a chelating agent in the methanol. Additionally, methanol formulations pass the abrasive test, such as a tape test, with better adhesion in less dilute formulations of a matrix material such as Polycrylic.

Example 6

According to the working example of FIGS. 6A-6D, formulations of Polycrylic and methanol at different ratios were provided after which various abrasive tests were carried out. Four formulations were first prepared having the ratios of Polycrylic:methanol of the following: 1:2; 1:4; 1:10; and 1:20. A chelating agent was then added to the formulation and thoroughly mixed. In the working example, the chelating agent was EDTA which was added at a rate of 5 mM. Quantum dots exhibits fluorescence of 655 nanometers were also added at a ratio of 20 nM. The formulations were then spot deposited in 10 µl drops on the brass target 30. The target 30 was air dried and then baked at 55° C. for 10 minutes. The targets 30, 31 were then subjected to a ultraviolet light and then photographed, the results of which are shown in FIG. 6A. The formulations having the ratios of 1:2 and 1:4 of Polycrylic:methanol were deposited in regions 60 and 62, respectively, and showed some fluorescence capabilities. The formulations having ratios of 1:10 and 1:20 were deposited in regions 64 and 66, respectively, on tag 31. As can be seen in FIG. 6A, the formulations having 1:10 and 1:20 were substantially stronger in their fluorescence than the formulations having 1:2 and 1:4.

It was thereafter desired to subject the quantum dots to various abrasive tests and weather tests. The tag 31 was therefore soaked in water for a period of time, in the range of 10-15 minutes. It was thereafter, air dried and baked at 55° C. for 15 minutes and again subjected to ultraviolet light as shown in FIG. 6B. As can be seen in FIG. 6B, the soaking in water and the subsequent drying and baking had no effect on the fluorescence level of the quantum dots. Subsequently, the brass tag 31 is subjected to a tape test in which a highly adhesive tape was applied across the brass tag 31 and strongly adhered to the brass tag 31. The tape was thereafter removed from the brass tag 31 and any parts of the quantum dots or formulation which adhered to the tape were removed as the tape was removed. The tape test is a test by which the adhesion of the quantum dot to the tag 31 can be reliably measured. As can be seen, when a first tape test was conducted, the quantum dot formulation having the ratio of 1:10 had considerably greater adhesion to the brass tag 31 than the formulation having a ratio of 1:20. A second tape test was then carried out subsequently to the first tape test on the same brass tag 31, which substantially reduced the quantum dots remaining on the tag 31 for the formulation having a ratio of 1:20, but which did not remove a substantial portion of the quantum dots deposited with the formulation of 1:10. Accordingly, it was determined that quantum dots having a ratio of Polycrylic:methanol of 1:10 is preferred for producing quantum dots having a high luminescence while exhibiting high adherence to the target.

As shown in FIGS. 6A-6D, less dilute formulations of the matrix material with the methanol provide better adhesion.

Example 7

Figures 7A, 7B, 7C:
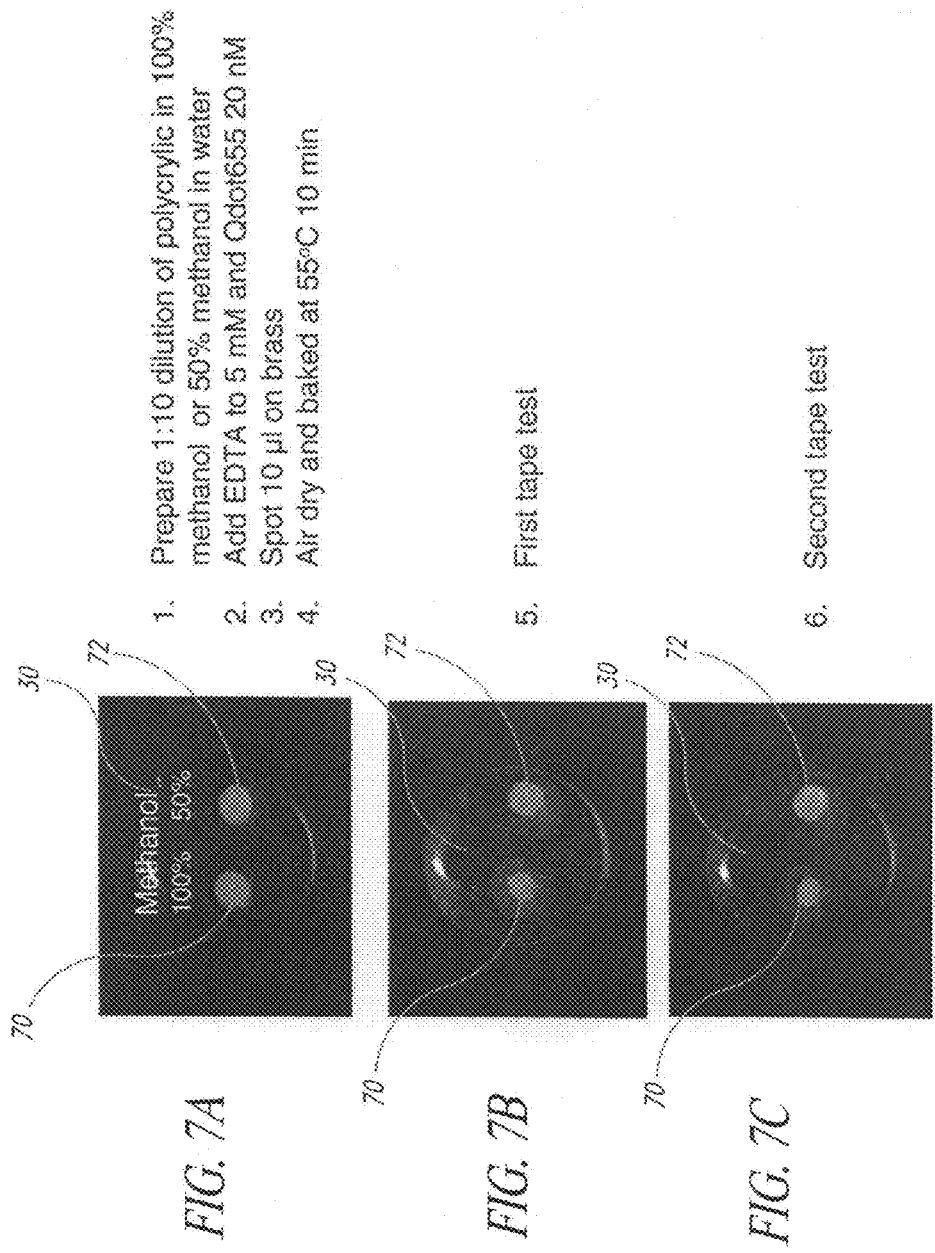
FIGS. 7A-7C illustrate a formulation of various combinations of a mixture of polyacrylate and polyurethane, methanol, and water and the results of abrasive tests.
Figure 10:
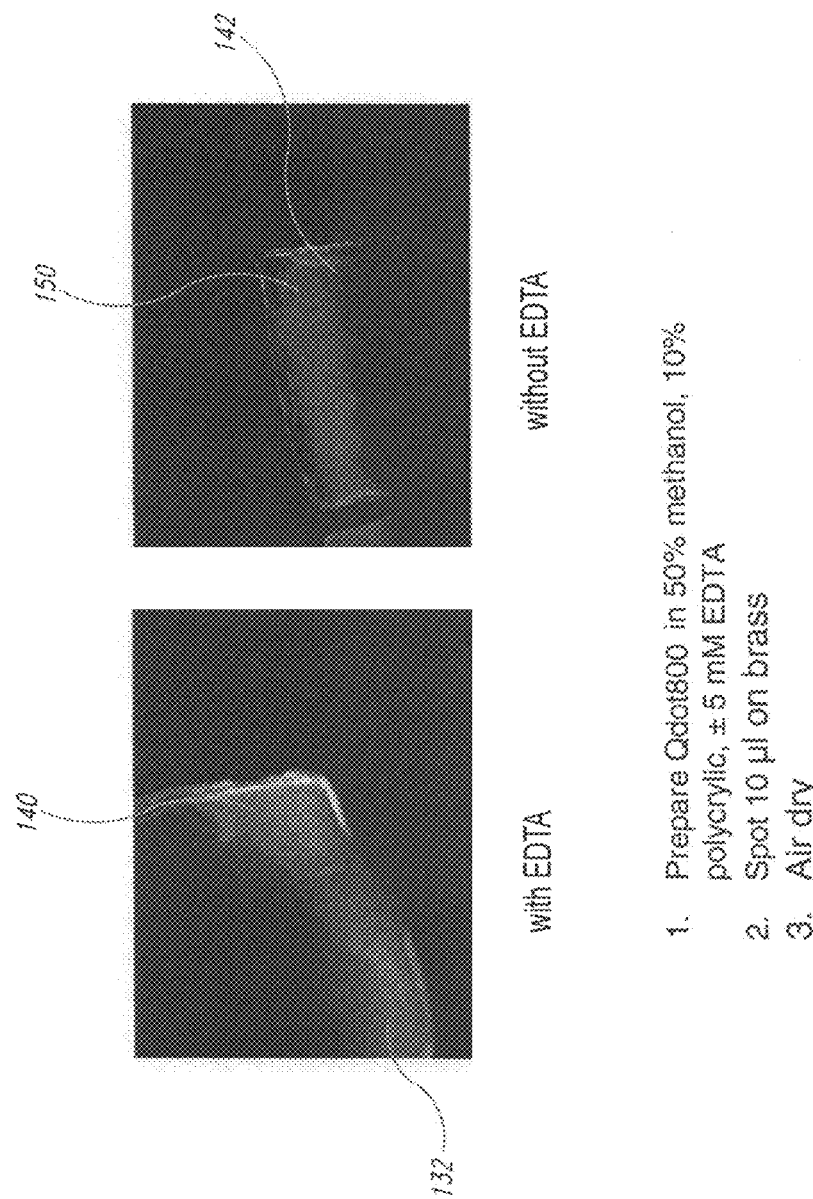
FIG. 10 shows a side-by-side view of quantum dot formulations, with and without a metal chelating agent, deposited on brass substrates.
Figure 11A:
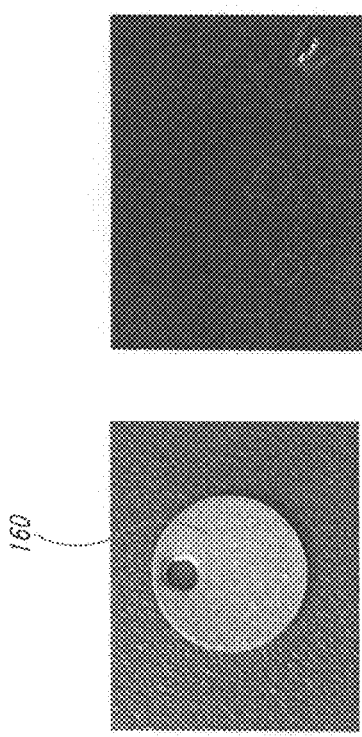
FIGS. 11A-11D show a quantum dot formulation having a metal chelating agent and a corrosion inhibitor agent on a brass substrate.
Figure 11B:
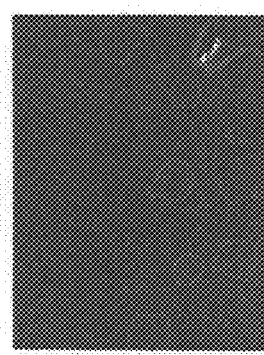
Figure 11C:
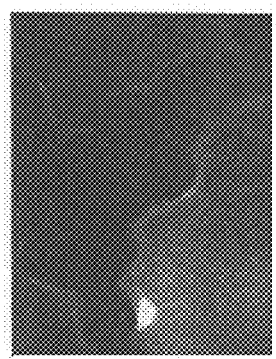
Figure 11D:
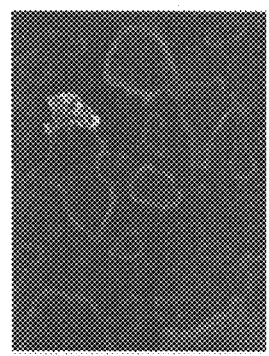

FIGS. 7A-7C illustrate additional examples of different formulations being prepared and applied to a metal tag for testing purposes. In the examples of FIGS. 7A-7C, two formulations were prepared. A first formulation had a ratio of Polycrylic:methanol of 1:10 and the same chelating agent provided as deposited in region 64 of FIG. 6A-6D. A second formulation was prepared by adding a mixture of 50% methanol and 50% water to Polycrylic at a dilution ratio of 1:10 of Polycrylic:methanol/water mixture. A chelating agent of EDTA was added to both formulations at 5 mM concentration as were 20 mM of quantum dots exhibiting fluorescence at 655 nanometers.

The two formulations were thereafter deposited on the tag 30 composed of brass using a spot deposition of 10 µl of the formulation on the brass. It was thereafter air dried and baked at 55° C. for 10 minutes.

The tag 30 was then exposed to ultraviolet light and the results shown in FIG. 7A. The fluorescence of the two formulations is approximately equal as shown in regions 70 and 72 of FIG. 7A. Subsequently, the tag 30 was subjected to a tape test for testing the adhesion of the quantum dots to the tag 30. The results are shown in FIG. 7B in which it is seen that the formulation containing 100% methanol as deposited in region 70 had a lower adhesion rate than the formulation containing 50% methanol/50% water, which was applied in region 72. A second tape test was then administered and the tag was photographed and the results shown in FIG. 7C. As can be seen, the tag 30 of FIG. 7C illustrates a greater reduction of fluorescence intensity than the pure methanol formulation and approximately no reduction in the fluorescence intensity of the 50% methanol/50% water formulation.

As shown in FIGS. 7A-7C, mixtures of methanol and water appear to provide the best emission of florescence and also have a high adhesion and adequately pass the tape test.

There are various techniques by which the quantum dot formulation can be applied to the target 30. One of the acceptable techniques is to provide a liquid formulation of the quantum dots and then apply it in a drop or spot technique of the formulation onto the target substrate. This is a common and well-accepted technique for applying quantum dots to desired substrates. Another accepted technique is to spray the quantum dot formulation as a fluid or as an aerosol onto the target substrate. For this type of application, the quantum dots are placed in a formulation and then sprayed through a nozzle which atomizes the formulation so that it passes as an aerosol through the air and adheres to the target. Additional techniques beside the spot application and fluid or vapor spray application may also be used for application of the quantum dots as taggants to the target.

Example 8

The application of corrosion inhibitors may also be beneficial to provide a method of preventing quenching of the fluorescence of quantum dots on a metal surface via a different mechanism. A corrosion inhibitor may bind tightly with metal such as copper and copper oxide. The interactions thus stabilize the metal surface and prevent the dissolution of metal ions into the solution. As a result, the fluorescence of the quantum dots on the metal surface is further improved by the addition of a corrosion inhibitor to a formulation which contains quantum dots. The formulation may also contain a chelating agent as a further measure to reduce the interaction between the metal ions and the formulation.

There are numerous acceptable corrosion inhibitors known in the art and these include benzotriazole (BTA), a vapor phase inhibitor (VPI), a volatile corrosion inhibitor (VCI), a gettering or scavenger agent in the matrix which reacts with the sulfur or metal agents to deactivate them, preventing further corrosion, a plating agent which places a thin layer of a corrosion protection agent on top of the metal surface, and bimolecular or chemical corrosion agents which may be deposited as a monolayer of barrier material from the formulation onto the metallic layer of the target. An example of the corrosion inhibitor is benzotriazole.

Example 9

FIGS. 8A-8E illustrate a working example in which a corrosion inhibitor was used for an embodiment when the taggant of the quantum dots was applied using a atomized spray. A formulation was prepared which was comprised of 50% solution of methanol and water, the ratio being 1:1 methanol: water. To this solution was added 10% polycrylic and 5 mM of a chelating agent, EDTA. The formulation was then divided into two tests; to one formulation was added 10 mM of a corrosion inhibitor, BTA, and to the other formulation was added no corrosion inhibitor. The two formulations were then provided to two brass tags 30 and 33 as shown in FIG. 8B and dried. The tags 30 and 33 were thereafter exposed to ultraviolet light to determine the efficacy of the fluorescing of the dried deposits of different formulations. FIG. 8A illustrates the fluorescing of the quantum dots with the corrosion inhibitor present in the region 80 and the corrosion inhibitor not present in the region 82. As can be seen, without the corrosion inhibitor, the quantum dots are not visible under ultraviolet light and therefore this formulation is ineffective as a tracking device.

The primary difference between the formulations of FIG. 7A-7C and FIGS. 8A-8E is the manner in which they were applied.

In the embodiments of FIGS. 2-7, the application method was the spot drop of a liquid onto the target after which it was air dried. In the embodiment of FIGS. 8A-8E, the formulation was sprayed in an atomized form onto the tags 30 and 33 and rapidly dried onto the tags 30 and 33.

As can be seen in FIG. 8A, the formulation on target 30 at area 80 containing the corrosion inhibitor is brightly visible, whereas the formulation on target 33 at area 82 not containing the corrosion inhibitor is invisible. The tag 30 was thereafter subjected to adhesion tests in the form of multiple tape tests. FIG. 8C illustrate the tag 30 following one tape test. As can be seen, the tape test removed nearly none of the deposited quantum dots. FIG. 8D illustrates the target 30 after being subjected to a second tape test. FIG. 8E illustrates the target 30 after being subjected to 10 tape tests. It can therefore be concluded that the application of the quantum dot formulation in an atomized spray form having chelating agent and corrosion inhibitor present has a high efficacy as applied to a metal target. The formulation is particularly beneficial for substrates of a base metal such as brass, stainless steel, copper, iron, or other metals and alloys containing copper and iron.

Example 10

According to this example, quantum dots that emit in the near IR region were formulated with a metal chelating agent, EDTA. The formulation was tested for the effect of EDTA in preventing the quantum dots from being quenched on a metal surface.

FIG. 9 shows Qdot®800 (Invitrogen) on various metal substrates as viewed by Gen 3 night vision scope under illumination of a 400 nm UV flash light. The scope was fitted with a narrow band 800 nm filter. The fluorescent shapes in FIG. 9 represent Qdot®800 sprayed on different metal substrates without EDTA. More specifically, 100 represents Qdot®800 sprayed on a brass surface coated with a layer of Polycrylic lacquer. 110 shows Qdot®800 on a bare brass surface. 120 shows Qdot®800 on an aluminum surface. 130 shows Qdot®800 on a stainless steel.

In the absence of any metal chelating agent, the fluorescence of the quantum dots is the weakest on the stainless steel surface and the strongest on the aluminum surface.

Moreover, the quantum dots appeared to have more intense fluorescence on the coated brass surface than they were on the bare brass surface. It is believe that the lacquer layer (about 30 μm thick) provides a spacer between the quantum dots and the brass surface. Such physical separation may have reduced the quenching of the quantum dots. The lacquer layer may further provide a sealing effect preventing any dissolution of the metal ions.

FIG. 10 shows a side-by-side view of quantum dot formulations, with and without EDTA, deposited on brass substrates.

On brass substrate 132, 10 μl of a quantum dot formulation (Formulation 21) was deposited, the quantum dot composition comprising 50 nM of Qdot®800 and 5 mM EDTA in 50% methanol, 10% Polycrylic and 40% water. The droplet exhibits fluorescence pattern 140 upon irradiation with 400 nm UV flash light.

On brass substrate 142, 10 μl of a quantum dot formulation was deposited, the quantum dot composition comprising 50 nM of Qdot®800 in 50% methanol, 10% Polycrylic and 40% water. No EDTA was present in the formulation. The droplet exhibits fluorescence pattern 150 upon irradiation with 400 nm UV flash light. As shown qualitatively, the fluorescent pattern 150 exhibits much weaker intensity that the fluorescent pattern 140.

FIGS. 11A-11D further illustrate that the fluorescence quenching is prevented. In particular, FIG. 11A shows a brass tag 160 sprayed with a formulation comprising 50 nM Qdot 800® (Invitrogen), 5 mM EDTA, 10 m BTA (Formulation 21). The fluorescence was viewed with Gen 3 night vision goggles upon irradiation with 400 nm UV flash light. FIG. 11B-11D shows different magnification of the fluorescent marks on the brass tag.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A formulation comprising:

a plurality of quantum dots selected from CdSe/ZnS and CdSeTe/ZnS; and a metal chelating agent including (ethylenedinitrilo)tetraacetic acid (EDTA); and a carrier material comprising water:methanol (1:1), polyacrylate and polyurethane.

2. The formulation of claim 1 wherein the metal chelating agent is present in the formulation at about from 1 mM to about 50 mM.

3. The formulation of claim 1 wherein the metal chelating agent is present in the formulation at about from 5 mM to about 15 mM.

4. The formulation of claim 1 wherein the quantum dots are further conjugated to a biomolecule.

5. The formulation of claim 4 wherein the biomolecule is protein or peptide.

6. The formulation of claim 1 wherein the quantum dots are present in the formulation at about 1 nM-500 nM.

7. The formulation of claim 1 wherein the quantum dots are present in the formulation at about 1 nM-100 nM.

8. The formulation of claim 1 wherein the quantum dots are present in the formulation at about 20 nM-50 nM.

9. The formulation of claim 1 further comprising a corrosion inhibitor.

10. The formulation of claim 9 wherein the corrosion inhibitor is present in the formulation at about 1 mM-50 mM.

11. The formulation of claim 9 wherein the corrosion inhibitor is present in the formulation at about 5 mM-20 mM.

12. The formulation of claim 9 wherein the corrosion inhibitor is benzotriazole, dithiothiadiazole, 2-aminopyrimidine, 5,6-dimethylbenzimidazole, 2-amino-5-mercapto-1,3,4-thiadiazole, 2-mercaptopyrimidine, 2-mercaptobenzoxazole, 2-mercaptobenzothiazole, or 2-mercaptobenzimidazole.

13. The formulation of claim 1 further comprising benzotriazole.

* * * * *